(12) United States Patent
Schmitt et al.

(10) Patent No.: US 6,470,254 B1
(45) Date of Patent: Oct. 22, 2002

(54) METHOD AND DEVICE FOR ADJUSTING THE BRAKING AND/OR DRIVE EFFECTS ON WHEEL OF MOTOR VEHICLES

(75) Inventors: Johannes Schmitt, Markgroeningen; Klaus-Peter Mattern; Rolf Gawlik, both of Beilstein, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/913,471

(22) PCT Filed: Dec. 6, 2000

(86) PCT No.: PCT/DE00/04341

§ 371 (c)(1),
(2), (4) Date: Nov. 28, 2001

(87) PCT Pub. No.: WO01/44031

PCT Pub. Date: Jun. 21, 2001

(30) Foreign Application Priority Data

Dec. 15, 1999 (DE) .......................... 199 60 337

(51) Int. Cl.⁷ ...................... G06F 7/00; G06F 17/00
(52) U.S. Cl. ................. 701/70; 701/1; 701/93; 180/170
(58) Field of Search .................... 701/70, 93, 96, 701/36, 1; 180/170

(56) References Cited

U.S. PATENT DOCUMENTS

| 5,033,799 A | * | 7/1991 | Braschel .................. 188/181 C |
| 5,979,584 A | * | 11/1999 | Glab et al. ................. 137/512.1 |
| 6,076,949 A | * | 6/2000 | Holdsworth et al. ......... 362/496 |

FOREIGN PATENT DOCUMENTS

| DE | 38 41 958 | 6/1990 |
| DE | 42 30 295 | 3/1994 |
| DE | 195 19 199 | 12/1995 |
| DE | 44 26 960 | 2/1996 |
| DE | 44 30 462 | 2/1996 |

* cited by examiner

*Primary Examiner*—William A. Cuchlinski, Jr.
*Assistant Examiner*—Olga Hernandez
(74) *Attorney, Agent, or Firm*—Kenyon & Kenyon

(57) ABSTRACT

A method and a device for adjusting the braking effect and/or driving effect at the wheels of a motor vehicle. For this purpose, a tire tolerance adjustment has at least two different operating modes. It is determined whether a mounted spare wheel or temporary spare wheel is present. One of the operating modes is selected as a function of the determined existence of a spare wheel.

22 Claims, 3 Drawing Sheets

METHOD AND DEVICE FOR ADJUSTING THE BRAKING AND/OR DRIVE EFFECTS ON WHEEL OF MOTOR VEHICLES

FIELD OF THE INVENTION

The present invention relates to a method and a device for adjusting the braking and/or driving effect at the wheels of a motor vehicle.

BACKGROUND INFORMATION

A plurality of systems for anti-lock braking control, for traction control, and/or for vehicle stability in motor vehicles are known from the related art. These systems generally start from at least the wheel rotational speeds or the wheel speeds of the vehicle wheels. However, before the wheel speeds are used for regulation, they are generally corrected by a so-called tire tolerance adjustment. Such a regulating system for a motor vehicle is described in German Published Patent Application No. 42 30 295, for example, in which errors in the wheel speeds created by tolerances between the tires are equalized. Such tolerances are due to different wheel diameters, for example. For example, a low-pass filtering in conjunction with a tire tolerance adjustment is described in German Published Patent Application No. 42 30 295.

Furthermore, a slip regulation system is known, for example, from European Published Patent Application No. 0 510 466, where the wheel rotational speeds are used for slip formation. To equalize the tire tolerances, the wheel speeds are corrected. When determining the appropriate correction factors, possibly existing cornering of the vehicle must be taken into consideration.

The variations for adjusting tire tolerances known from the related art generally require relatively long time intervals. If the braking regulation and/or driving regulation is acted upon shortly after the vehicle is started, a slow tire tolerance adjustment can potentially result in unfavorable conditions.

If there is tire damage on a motor vehicle, often only a temporary spare wheel or spare wheel is provided. In contrast to standard wheels, this temporary spare wheel or spare wheel has a significantly smaller diameter which is to be taken into consideration by a tire tolerance adjustment. A detection of such temporary spare wheels or spare wheels is known from European Published Patent Application No. 0 449 845, for example.

SUMMARY OF THE INVENTION

As mentioned, the present invention relates to a method and a device for adjusting the braking effect and/or driving effect at the wheels of a motor vehicle. Assigned to the wheels are sensors that emit speed signals representing the rotary motions of the wheels. These speed signals are corrected via a correction, i.e., the tire tolerance adjustment. The braking and/or driving effect is/are adjusted at least as a function of corrected sensor speed signals.

According to the present invention, the correction, i.e., the tire tolerance adjustment, has at least two different modes of operation. Furthermore, it is determined whether a mounted spare wheel or temporary spare wheel having a smaller diameter than the remaining wheels is present. One of the operating modes is then selected in accordance with the present invention, as a function of the determined existence of a spare wheel.

According to the present invention, a selection module is connected in series with and upstream from the actual tire tolerance adjustment, the selection module selecting a specific operating mode in response to a temporary spare wheel being present. This certain operating mode of the tire tolerance adjustment advantageously enables a particularly quick tire tolerance adjustment. The actual, slow tire tolerance adjustment, which is, however, generally more precise, follows the first, quick tire tolerance adjustment. As a result of this adjustment algorithm, the rotational speed of a temporary spare wheel or spare wheel is very quickly adjusted to the other wheel speeds. As a result of the present invention, the temporary spare wheel adjustment is carried out in such a manner that the complete functionality of an anti-lock control system, traction control system, and/or vehicle stability system or of an electronic braking force distribution system is already present when braking for the first time. Thus, no additional measures are necessary.

In an advantageous embodiment of the present invention, it is provided that the correction, i.e., the tire tolerance adjustment, is carried out more quickly in a first operating mode having a smaller filtering time constant than in a second operating mode having a larger filtering time constant.

A further embodiment of the present invention start from the assumption that the standard, slow tire tolerance adjustment is carried out as a function of the output torque of the vehicle engine. This can be inferred, for example, from the document German Published Patent Application No. 42 30 295 mentioned at the outset. Thus, for the standard, i.e., slow, tire tolerance adjustment, a certain condition is given for the engine torque in order for the tire tolerance adjustment to be carried out. For example, the drive torque or the drag torque acting on the wheels is sufficiently low. However, this condition slows the tire tolerance adjustment in cases in which the engine torque does not satisfy this condition. According to this embodiment of the present invention, it is provided that the correction is carried out in a first, quick operation mode of the tire tolerance adjustment, independently of the engine torque.

It is further known to attach the tire tolerance adjustment to the condition that no cornering exists. In an additional embodiment of the present invention, it is provided that it be determined whether the vehicle is traveling on a curve. According to this embodiment, the tire tolerance adjustment is performed in the first, quick operating mode, independently of determined cornering.

In a further embodiment of the present invention, it is provided that, in the first, quick operating mode, the tire tolerance adjustment is performed at lower forward speeds of the vehicle than in a second, slower operating mode.

However, the determination of whether there is a mounted temporary spare wheel or spare wheel is advantageously only begun when a predefinable speed threshold value for the vehicle's forward speed is exceeded.

In a further advantageous embodiment of the present invention, it is provided that the determination of whether there is a mounted temporary spare wheel or spare wheel occurs in such a manner that the wheel having the highest rotational speed is determined from the speed signals;

a check is performed to determine whether the rotational speed of the wheel having the highest rotational speed deviates in a predefinable manner from the rotational speed having the speed of at least one other wheel, in particular of the wheel mounted on the same vehicle axle;

it is determined from the differences of the rotational speeds of the wheels on the axle on which the wheel having the highest rotational speed is not mounted whether cornering exists; and the wheel having the highest rotational speed is determined as the temporary spare wheel or spare wheel provided that the rotational speed of this wheel deviates in a predefinable manner and especially for a predefinable period of time from the rotational speed of at least one other wheel, and there is no cornering.

In a further embodiment of the present invention, it is provided that the mode selected when a temporary spare wheel or spare wheel is present is terminated as a function of the result of a comparison of the corrected output signal of the temporary spare wheel or the spare wheel to an output signal of at least one sensor at another wheel. This is because the quick and tolerant tire tolerance adjustment is only intended to enable a first, quick adaptation of the temporary spare wheel to the reference wheel. The standard tire tolerance adjustment including its release conditions is to subsequently apply again. The quick and tolerant tire tolerance adjustment is, therefore, ended when the rotational speed of the temporary spare wheel or spare wheel deviates less than 1.5%, for example, from the other wheel rotational speeds.

DETAILED DESCRIPTION

Embodiments of the present invention are described below in light of the exemplary embodiments.

Figure 1:
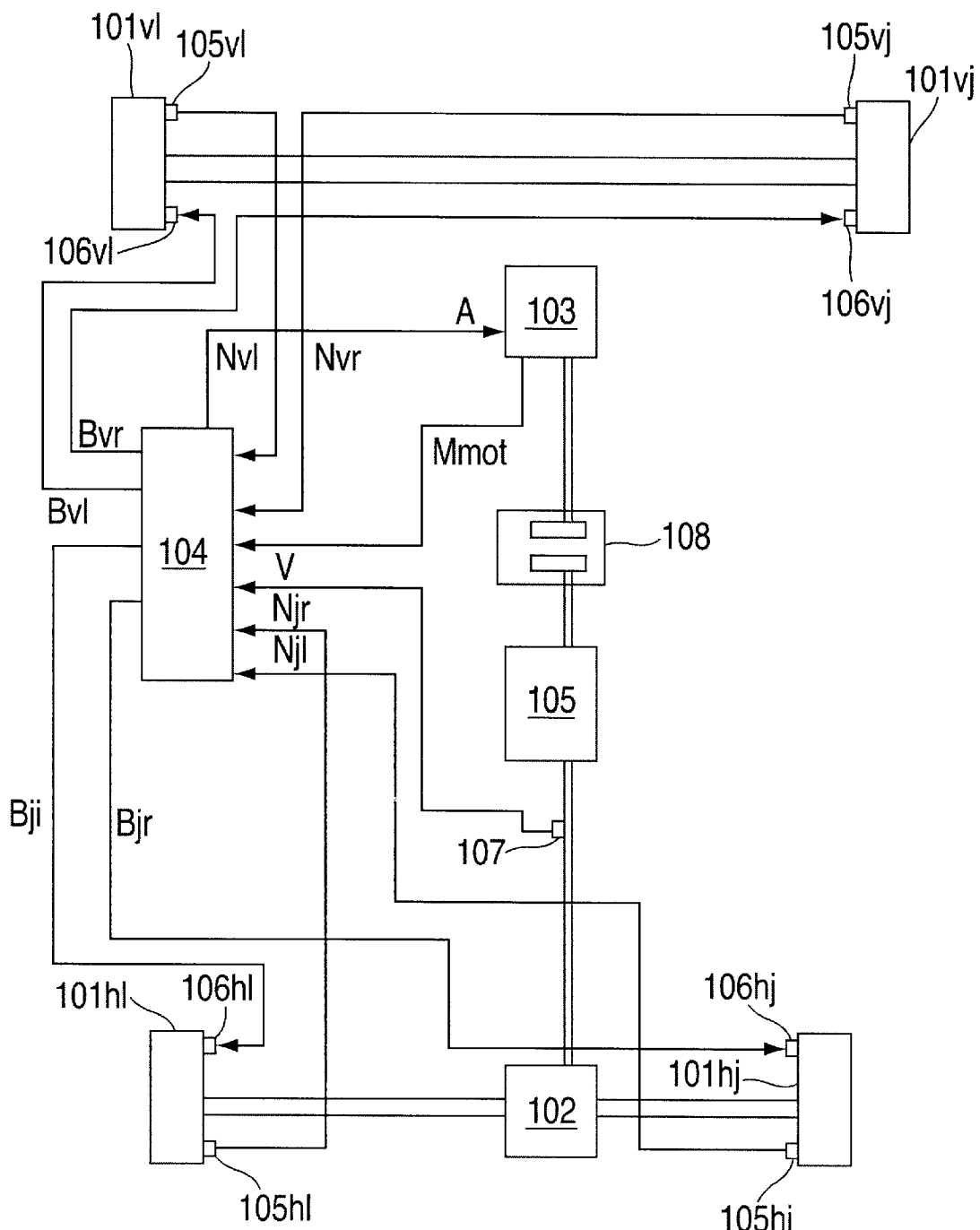
FIG. 1 shows an overview of a block diagram of the present invention.

FIG. 1 shows a schematic view of a vehicle having vehicle wheels 101*ij*. In the following, the index i designates the association of the corresponding quantity with the rear (i=h) or the front (i=v) vehicle axle. The index j indicates the association of the corresponding quantity with the right (j=r) or the left (j=l) side of the vehicle. Speed sensors 105*ij* and wheel brake units 106*ij* are mounted on vehicle wheels 101*ij*. Wheel speed sensors 105*ij* send their output signals Nij to control unit 104. In control unit 104, drive signals Bij for wheel brake units 106*ij* are formed at least as a function of wheel speed values Nij. This occurs in a generally known manner, for example, by forming slip values for individual vehicle wheels 101*ij* from wheel speeds Nij, the braking effect and/or the driving effect at the individual vehicle wheels being subsequently adjusted via signals Bij and/or A in such a manner that a specific brake slip or drive slip is not exceeded.

In addition, the vehicle's drive train is sketched in FIG. 1. In this context, reference numeral 103 designates the vehicle engine whose output power or output torque or output rotational speed can be controlled or regulated via control unit 104, using drive signal A. The output torque of engine 103, which, in engine management, generally exists as torque signal Mmot, is directed to control unit 104.

Vehicle engine 103 is connected to transmission 105 via clutch 108. Transmission 105 is then connected via differential 102 to the drive gears on the back axle. The output rotational speed of the transmission is determined via speed sensor 107. Corrected by the transmission ratio of differential 102 and/or by the wheel diameter at the driving wheels, the output rotational speed of the transmission is a measure of forward speed V of the vehicle.

Figure 2:
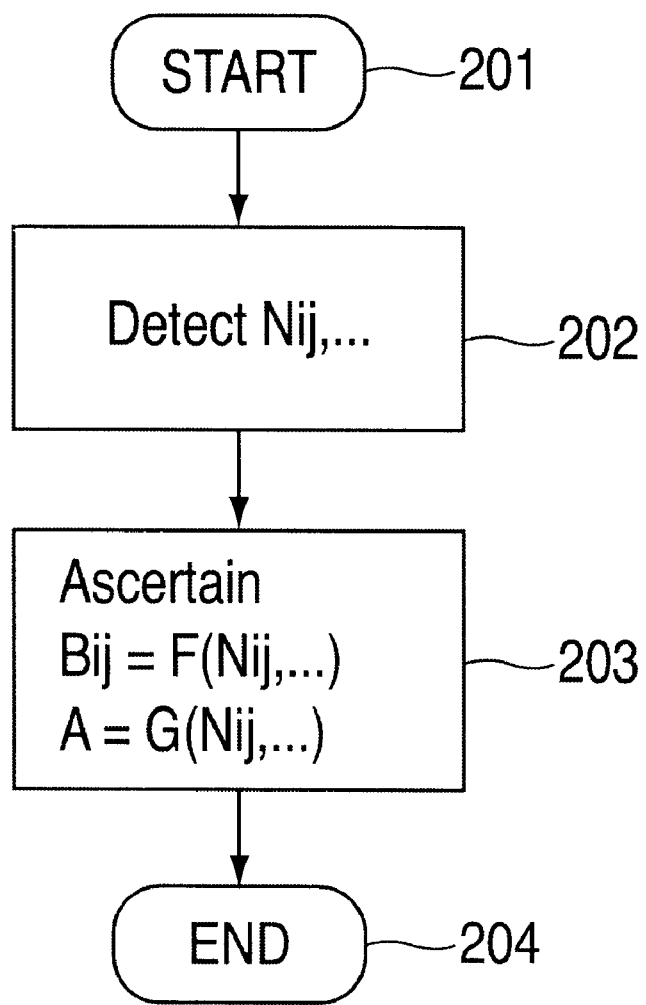
FIG. 2 shows the basic sequence of the adjustment of the braking effect and/or driving effect at the wheels.

The adjustment of the braking and/or driving effect at vehicle wheels 101*ij* via control unit 104 is shown schematically in FIG. 2. After initial step 201, wheel speed signals Nij and additional signals are detected in following step 202. In step 203, the drive signals for wheel brakes 106*ij* (drive signal Bij) and drive signal A for vehicle engine 103 are formed at least as a function of detected wheel speed signals Nij. This is indicated in step 203 by functional dependence F and G. After final step 204, the sequence shown in FIG. 2 is restarted. The formation of drive signals Bij and A is described frequently in the related art and will not be explained in greater detail here.

Figure 3:
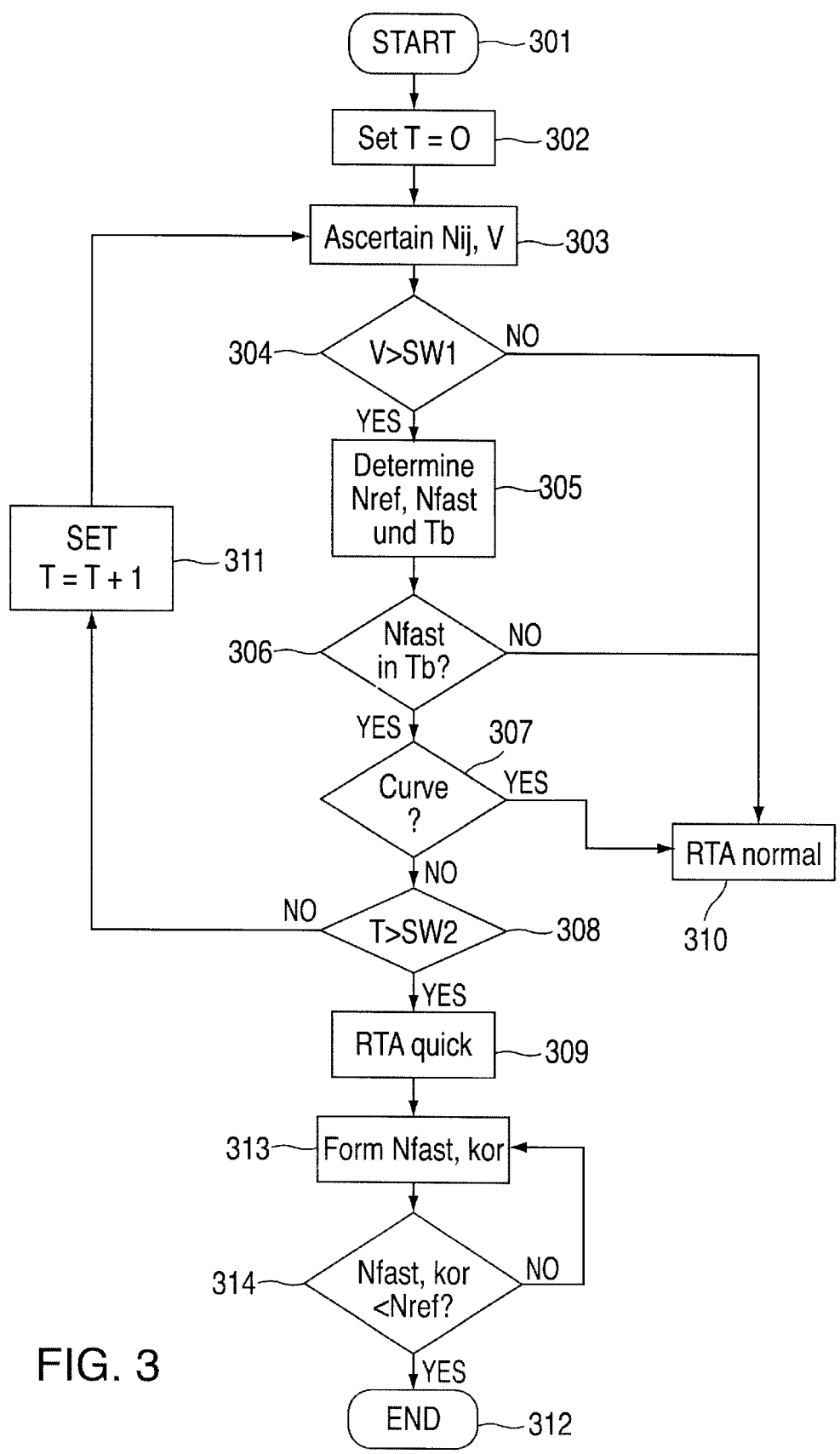
FIG. 3 shows the detailed sequence of a specific embodiment of the present invention.

FIG. 3 shows a detailed sequence of an exemplary embodiment according to the present invention.

After start step 301, counter value T is first set to zero in step 302. In step 303, wheel speeds Nij or the vehicle's forward speed is/are determined.

In query 304, forward speed V of the vehicle is compared to a threshold value SWI. If forward speed V of the vehicle does not exceed threshold value SWI, the following conditions for quick tire tolerance adjustment 309 are not checked. In this case, standard tire tolerance adjustment 310 including its special acceptance conditions (e.g. conditions for the engine torque, cornering, etc.) is carried out.

However, if forward speed V of the vehicle does exceed threshold value SW1, the vehicle is traveling at a sufficiently high vehicle speed, whereupon the fastest rotating wheel is determined in step 305. This wheel exhibits non-corrected wheel speed Nfast. Furthermore, non-corrected wheel speed Nref of the other wheel of the same axle (reference wheel) is loaded into a temporary register for further processing.

In addition, a tolerance band Tb is formed in step 305. Predefinable threshold values SWu and SWo are provided for this purpose. Using wheel speed Nref of the reference wheel, tolerance band Tb is calculated in correspondence with the possibly mounted temporary spare wheels. For this purpose, a lower value SWu as well as an upper value SWo are added to wheel speed Nref of the reference wheel. In this manner, one obtains tolerance band Tb:

$$Tb=[(Nref+SWu); (Nref+SWo)]$$

Step 306 determines whether speed Nfast of the fastest wheel is within tolerance band Tb. If this is not the case, the fastest wheel is obviously not a temporary spare tire or spare tire. Standard tire tolerance adjustment 310 is then performed.

However, if step 306 determines that rotational speed Nfast is within the tolerance band, this wheel is a temporary spare wheel or a spare wheel. Subsequent step 307 then determines whether the vehicle is cornering at the moment. Cornering is checked for in light of the following condition.

The difference in the wheel speeds of the axle on which the supposed temporary spare wheel (fastest wheel) is not located is to be less than or equal to a certain threshold value. If this is the case, it can be assumed that the vehicle is traveling on a curve having a larger radius of curve or is traveling straight. In this case, step 308 is the next step. However, if the vehicle is traveling on a curve having a small radius of curve, standard tire tolerance adjustment 310 including its special acceptance conditions is performed. If it is determined, for example, that the temporary spare wheel (fastest wheel) is located on the front axle, the amount of the rotational speed difference $\Delta N=|(Nhr-Nhl)|$ of the back wheels is compared to a relatively small threshold value SW3, which can, for example, be selected as a function of the vehicle's forward speed, in order to detect curves. If rotational speed difference ΔN is less than threshold value SW3, there is essentially no cornering. If rotational speed difference ΔN exceeds threshold value SW3, there is cornering.

To detect curves in step 307, a steering angle signal, a transverse acceleration signal, and/or a yaw angle signal can be used, provided that the appropriate sensors are present in or on the vehicle.

Query 308 determines whether counter value T exceeds a corresponding, predefinable threshold value SW2. If this is not the case, the counter value is increased by one counter value in step 311, and the already described sequence is restarted with step 303.

However, if step 308 determines that the counter value exceeds threshold value SW2, the conditions for quick tire tolerance adjustment 309 have been present for a sufficient length of time. In this case, quick tire tolerance adjustment 309 is performed.

The quick and tolerant tire tolerance adjustment 309 is only intended to enable a first, quick adaptation of the temporary spare wheel to the reference wheel. The standard tire tolerance adjustment including its release conditions is to subsequently apply again. This is achieved in that wheel speed Nfast of the temporary spare wheel is corrected to form corrected wheel speed Nfast,kor in step 313. In subsequent step 314, corrected value Nfast,kor is compared to rotational speed Nref of the reference wheel. As long as corrected value Nfast,kor is greater than reference rotational speed Nref, quick tire tolerance adjustment 309 is maintained. However, as soon as corrected value Nfast,kor exceeds rotational speed Nref of the reference rotational speed, the quick tire tolerance adjustment is terminated in final step 312. In step 314, the difference (Nfast,kor−Nref) can also be compared to a threshold value that is 1.5% of Nref, for example.

After the correction is terminated in operating mode $RTA_{quick}$, this operating mode $RTA_{quick}$ is blocked for at least a period of time. In particular, it can be provided that the blocking is maintained at least until the vehicle is started again. In this manner, a further, possibly incorrect, quick adjustment during the remaining drive is prevented. However, the blocking of this operating mode $RTA_{quick}$ can be canceled or not induced when the existence of cornering is detected during operating mode $RTA_{quick}$. In this case, mode $RTA_{quick}$ continues to be allowed.

According to the present invention, a software module detects the typical speed difference of a temporary spare wheel or spare wheel with respect to other wheel rotational speeds. Certain conditions are then checked in accordance with the present invention:

The vehicle is traveling at a significantly high speed (query 303).

No additional wheel satisfies the temporary spare wheel or spare wheel condition.

A time criterion is satisfied (query 308).

If these conditions are satisfied, the subsequent tire tolerance adjustment module is modified, so that it is enabled as being tolerant and is quickly carried out until the temporary spare wheel is adjusted to a certain percentage. This occurs such that the tire tolerance adjustment is begun upon initiating travel;

the tire tolerance adjustment is carried out independently of the engine torque;

the tire tolerance adjustment is carried out more quickly (smaller filtering time constant); and the tire tolerance adjustment is carried out in a curve-tolerant manner, i.e., independently of whether cornering exists.

The quick and tolerant, tire tolerance adjustment is terminated when the rotational speed of the temporary spare wheel or spare wheel deviates less than 1.5%, for example, from the other wheel rotational speeds. By way of exception, the quick tire tolerance adjustment is repeated after cornering when this quick tire tolerance adjustment was performed before or during cornering.

As a result of the present invention, the temporary spare wheel adjustment is carried out in such a manner that the complete functionality of an anti-lock control system or of an electronic braking force distribution system is already present when braking for the first time. Thus, no additional measures are necessary.

In a further embodiment of the present invention, it is provided that a status signal is generated when a mounted temporary spare wheel or spare wheel is present. The functioning of other vehicle systems, such as systems for anti-lock brake control, for traction control, and/or for vehicle stability are modified as a function of this status signal.

In this context, it is particularly provided that the status signal is supplied via a data line, in particular via a bus system (CAN bus, Controller Area Network), to other vehicle systems for controlling and/or regulating vehicle functions. Thus, for example, provision can be made for the vehicle's forward speed to be limited when a temporary spare wheel or a spare wheel is detected.

Furthermore, the status signal can be used for triggering a display that can be observed by the driver. In the event that a temporary spare wheel or a spare wheel is present, this is displayed to the driver. As a result, the driver is continually reminded that a temporary spare wheel or a spare wheel is mounted.

Furthermore, a monitoring element can be provided via which slip values of the wheels are measured and evaluated in such a manner that, given the existence of slip values of a certain, preselectable magnitude, predefinable measures are introduced. For example, in the case of such sustained slip monitoring, it can be provided that braking and/or driving systems are switched off when sufficiently high slip values have been present for a sufficient period of time. If the monitoring element evaluates the uncorrected wheel rotational speeds, the monitoring element is deactivated when a temporary spare wheel or a spare wheel is detected.

What is claimed is:

1. A method for adjusting at least one of a braking effect and a driving effect at wheels of a motor vehicle, the wheels including at least two wheels and sensors that are assigned to the at least two wheels, the method comprising the steps of:

causing the sensors to generate speed signals representing rotary motions of the at least two wheels;

correcting the speed signals by a correction that includes at least two different operating modes;

adjusting the at least one of the braking effect and the driving effect at least as a function of the corrected speed signals of the sensors;

determining whether one of a mounted temporary spare wheel and a spare wheel having a smaller radius than remaining ones of the at least two wheels is present; and selecting one of the at least two different operating modes as a function of the determined presence of the one of the mounted temporary spare wheel and the spare wheel having a smaller radius than remaining ones of the at least two wheels.

2. The method according to claim 1, wherein:

the at least two different operating modes include a first operating mode and a second operating mode, a filtering time constant of the first operating mode is smaller than that of the second operating mode, and the step of correcting is performed more quickly in the first operating mode than in the second operating mode.

3. The method according to claim 1, wherein:

the at least two different operating modes include a first operating mode and a second operating mode, the motor vehicle is driven by a vehicle engine, and the step of correcting is performed:
  in the second operating mode as a function of an engine quantity representing at least one of an output torque of the vehicle engine and an output power of the vehicle engine, and
  in the first operating mode independently of the engine quantity.

4. The method according to claim 1, further comprising the step of:

determining whether the motor vehicle is traveling on a curve, wherein:
  the at least two different operating modes include a first operating mode and a second operating mode, and
  the step of correcting is performed in the second operating mode as a function of a detected cornering, and is performed in the first operating mode independently of the detected cornering.

5. The method according to claim 1, further comprising the step of:

determining a forward speed of the motor vehicle, wherein:
  the at least two different operating modes include a first operating mode and a second operating mode, and
  the step of correcting is performed in the first operating mode at a lower value for the forward speed of the motor vehicle than in the second operating mode.

6. The method according to claim 1, further comprising the steps of:

determining a forward speed of the motor vehicle; and beginning the step of determining in response to an exceeding of a predefinable speed threshold value.

7. The method according to claim 1, wherein:

the step of determining is performed such that:
  the wheel having a highest rotational speed is determined from the speed signals,
  a check is performed to determine whether the highest rotational speed deviates in a predefinable manner from a rotational speed of at least one other wheel,
  whether a cornering exists is determined from differences in rotational speeds of the wheels on the axle on which the wheel having the highest rotational speed is not mounted, and
  the wheel having the highest rotational speed is determined as the one of the temporary spare wheel and the spare wheel having a smaller radius than remaining ones of the at least two wheels provided that the rotational speed of the wheel having the highest rotational speed deviates in a predefinable manner for a predefinable period of time from a rotational speed of at least one other wheel, and provided there is no cornering.

8. The method according to claim 7, wherein:

the at least one other wheel and the wheel having the highest rotational speed are mounted on the same vehicle axle.

9. The method according to claim 1, further comprising the steps of:

selecting one of the at least two different operating modes in response to the presence of the one of the mounted temporary spare wheel and the spare wheel having a smaller radius than remaining ones of the at least two wheels; and terminating the selected one of the at least two different operating modes as a function of a comparison of a corrected output signal of the one of the mounted temporary spare wheel and the spare wheel having a smaller radius than remaining ones of the at least two wheels, to the speed signal of at least one of the sensors at another of the at least two wheels.

10. The method according to claim 1, wherein:

following termination of the correction in the one of the at least two different operating modes selected when the one of the mounted temporary spare wheel and the spare wheel having a smaller radius than remaining ones of the at least two wheels is present, the selected one of the at least two different operating modes is blocked for at least a period of time.

11. The method according to claim 10, wherein:

the selected one of the at least two different operating modes is blocked until a next time the motor vehicle is started.

12. The method according to claim 10, wherein:

the blocking is one of canceled and not induced when a presence of cornering is determined during the selected one of the at least two different operating modes.

13. The method according to claim 1, further comprising the steps of:

generating a status signal when the one of the mounted temporary spare wheel and the spare wheel having a smaller radius than remaining ones of the at least two wheels is present; and modifying a functioning of vehicle systems including at least one of an anti-lock brake control system, a traction control system, and a vehicle stability control system as a function of the status signal;

performing at least one of the steps of:
  supplying the status signal via a data line to other vehicle systems for at least one of controlling and regulating vehicle functions,
  limiting a forward speed of the motor vehicle when the one of the mounted temporary spare wheel and the spare wheel having a smaller radius than remaining ones of the at least two wheels is detected,
  causing the status signal to trigger a display that can be observed by a driver when the one of the mounted temporary spare wheel and the spare wheel having a smaller radius than remaining ones of the at least two wheels is present, and
  providing a monitoring element via which slip values of the at least two wheels are measured and evaluated in such a manner that, given an existence of slip values of a specific, preselectable magnitude, predefinable measures are introduced, and the monitoring element is deactivated when the presence of the one of the mounted temporary spare wheel and the spare wheel having a smaller radius than remaining ones of the at least two wheels is detected.

14. The method according to claim 13, wherein:

the data line includes a bus system.

15. A device for adjusting at least one of a braking effect and a driving effect at wheels of a motor vehicle, the wheels including at least two wheels and sensors that are assigned to the at least two wheels, the device comprising:

an arrangement for causing the sensors to generate speed signals representing rotary motions of the at least two wheels;

an arrangement for correcting the speed signals by a correction that includes at least two different operating modes;

an arrangement for adjusting the at least one of the braking effect and the driving effect at least as a function of the corrected speed signals of the sensors;

an arrangement for determining whether one of a mounted temporary spare wheel and a spare wheel having a smaller radius than remaining ones of the at least two wheels is present; and an arrangement for selecting one of the at least two different operating modes as a function of the determined presence of the one of the mounted temporary spare wheel and the spare wheel having a smaller radius than remaining ones of the at least two wheels.

16. The device according to claim 15, wherein:

the at least two different operating modes include a first operating mode and a second operating mode, a filtering time constant of the first operating mode is smaller than that of the second operating mode, and the arrangement for correcting performs the correcting more quickly in the first operating mode than in the second operating mode.

17. The device according to claim 15, wherein:

the at least two different operating modes include a first operating mode and a second operating mode, the motor vehicle is driven by a vehicle engine, and the arrangement for correcting performs the correcting:

in the second operating mode as a function of an engine quantity representing at least one of an output torque of the vehicle engine and an output power of the vehicle engine, and in the first operating mode independently of the engine quantity.

18. The device according to claim 15, further comprising:

an arrangement for determining whether the motor vehicle is traveling on a curve, wherein:

the at least two different operating modes include a first operating mode and a second operating mode, and the arrangement for correcting performs the correcting in the second operating mode as a function of a detected cornering, and performs the correcting in the first operating mode independently of the detected cornering.

19. The device according to claim 15, further comprising:

an arrangement for determining a forward speed of the motor vehicle, wherein:

the at least two different operating modes include a first operating mode and a second operating mode, and the arrangement for correcting performs the correcting in the first operating mode at a lower value for the forward speed of the motor vehicle than in the second operating mode.

20. The device according to claim 15, further comprising:

an arrangement for determining a forward speed of the motor vehicle; and an arrangement for beginning the determining performed by the arrangement for determining in response to an exceeding of a predefinable speed threshold value.

21. The device according to claim 15, wherein:

the arrangement for determining performs the determining such that:

the wheel having a highest rotational speed is determined from the speed signals, a check is performed to determine whether the highest rotational speed deviates in a predefinable manner from a rotational speed of at least one other wheel, whether a cornering exists is determined from differences in rotational speeds of the wheels on the axle on which the wheel having the highest rotational speed is not mounted, and the wheel having the highest rotational speed is determined as the one of the temporary spare wheel and the spare wheel having a smaller radius than remaining ones of the at least two wheels provided that the rotational speed of the wheel having the highest rotational speed deviates in a predefinable manner for a predefinable period of time from a rotational speed of at least one other wheel, and provided there is no cornering.

22. The device according to claim 15, further comprising:

an arrangement for selecting one of the at least two different operating modes in response to the presence of the one of the mounted temporary spare wheel and the spare wheel having a smaller radius than remaining ones of the at least two wheels; and an arrangement for terminating the selected one of the at least two different operating modes as a function of a comparison of a corrected output signal of the one of the mounted temporary spare wheel and the spare wheel having a smaller radius than remaining ones of the at least two wheels, to the speed signal of at least one of the sensors at another of the at least two wheels.

* * * * *